United States Patent Office 3,619,844
Patented Nov. 16, 1971

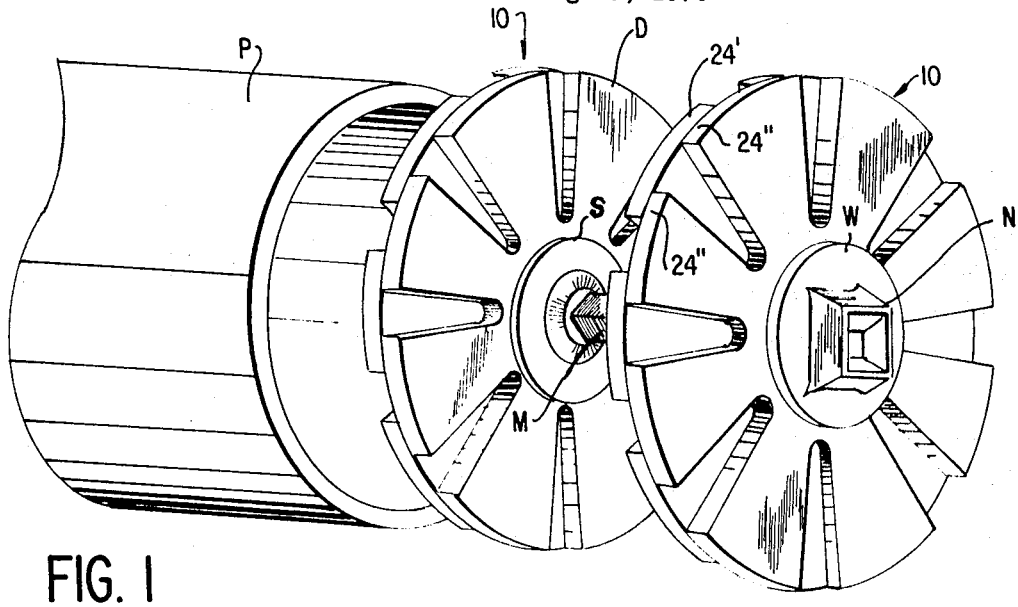
FIG. 1
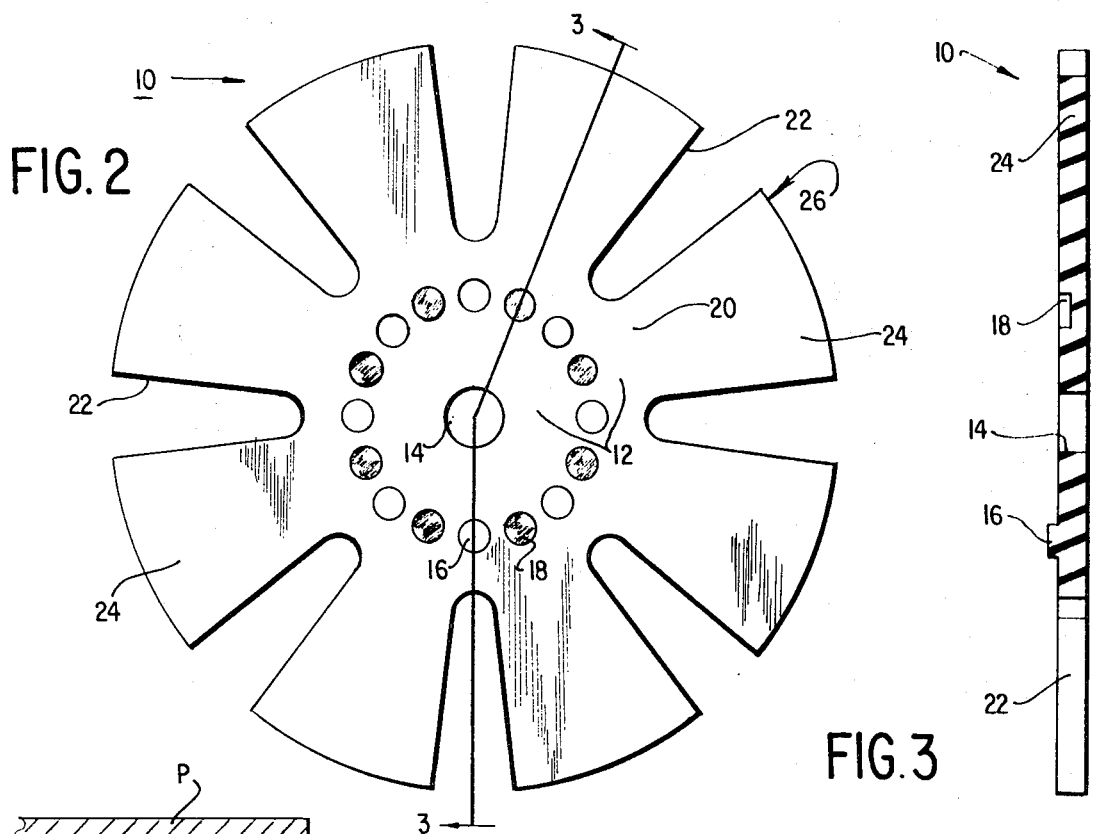
FIG. 2
FIG. 3
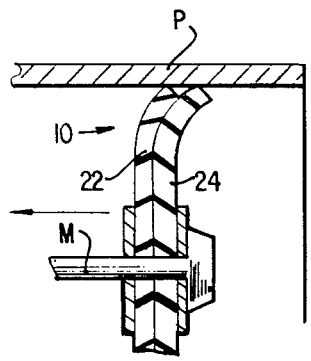
FIG. 4
INVENTORS
WILBUR W. COLLINS
JACK L. YOST

3,619,844
DISC TYPE PIPELINE SCRAPER AND BATCH SEPARATOR
Wilbur W. Collins and Jack L. Yost, Arlington, Tex., assignors to Oil States Rubber Co.
Filed Aug. 3, 1970, Ser. No. 60,549
Int. Cl. B08b 9/04
U.S. Cl. 15—104.06 R   5 Claims

ABSTRACT OF THE DISCLOSURE

A pipeline scraper and batch separator employing multiple similar molded plastic scraper discs having interlocking patterns on their faces for holding the discs in predetermined mutual circumferential orientation when the patterns are mated and the discs are clamped together on a mandrel, the discs having outwardly extending scraper segments alternating with notched-out segments, and the interlocking patterns holding the scraper segments of one disc over the notched-out segments of an adjacent disc so as to form a composite substantially-sealing structure useful either as scraper or as a batch separator.

---

This invention relates to a novel pipeline scraper and batch separator of the type employing multiple scraper means mounted in stacked relationship on a mandrel.

The present structure comprises plural segmented discs having holes through their central portions for mounting on the mandrel, the discs being stacked thereon in such a way that the scraper segments of one disc cover notched-out spaces between scraper segments of another disc so that the several discs engage substantially the full periphery of the pipeline as they pass through it, and so that adjacent discs become sufficiently fluid tight that the assembly can be pumped through the pipeline by fluid pressure differential in a manner which is known per se in the prior art with respect to cup type scrapers and batch separators. Examples of the prior art include Williams 277,398 and Jacobson 2,129,091.

It is a principal object of the present invention to provide an improved disc type assembly having novel individual discs, all of which can be made identical. One feature of novelty of the present invention resides in the molded structure of the scraper discs themselves which are preferably molded of plastic, such as a castable polyurethane. Such plastic materials are hard enough to scrape foreign matter from the inside of pipelines, while at the same time being flexible enough to follow the contour of the pipeline surfaces being scraped. Another advantage of the plastic material is that it is substantially corrosion-free, and resists the build-up of foreign matter on its own surface to which adhesion is usually quite poor.

It is another object of the present invention to provide an improved type of disc having an outer portion with deeply-notched-out, annularly spaced segments leaving alternate outwardly-extending scraper segments therebetween, the scraper segments being preferably at least as broad in circumferential extent as the notched-out segments therebetween. Each disc further includes a central portion having a hole through its center to receive the mandrel, and having on the face of the central portion a pattern comprising an annular series of projections and matching sockets disposed with relationship to the segments of the outer portion of the disc in such a way that when two discs are mated together with the projections of each interlocking with the sockets of the other, the discs are oriented with the scraper segments of one disc covering the notched-out segments of the other disc. In this way, each pair of discs forms a continuous annular member which is well enough sealed that a differential in pressure can be set up across the pair of discs sufficient to propel it along inside the pipeline. However, the present invention is not to be limited to pressure-propelled assemblies in view of the fact that the assemblies can either be pushed or pulled through the pipeline by mechanical means attached to the mandrel as an alternative procedure.

It is another important object of this invention to have the notched-out segments in the outer portion of each disc extend deeply thereinto toward the center of the disc so that the scraper segments are thus made long in the radial direction and are therefore relatively flexible. This length and flexibility permits the discs to faithfully follow the contour of the pipeline despite enlargements and restrictions which may occur from time to time therein, while at the same time contacting the entire surface to be scraped. This feature also permits the assembly to be effectively used in pipelines having a considerable range of diameters, whereas in the past each disc scraper assembly has been suitable for use only in one size of pipeline.

It is another object of the present invention to provide an interlocking pattern of projections and sockets so disposed on the disc with respect to the scraper segments and the notched-out segments therebetween that the scraper segments of the trailer disc back up the notched-out segments of the leading disc of each pair in a symmetrical manner.

It is another important object of the invention to provide a moldable disc structure per se which can be readily manufactured in one operation which is relatively simple and economical to perform, and which operation provides the only type of disc structure necessary from which to form mating stacks of discs for mounting on a mandrel between suitable shoulder means thereof. In a practical assembly, these shoulder means may comprise washers fixed upon the mandrel by nuts, the peripheries of these washers lying within the central portion of the disc which they respectively contact, and the trailing washer being large enough in diameter to prevent the possibility of stripping the trailing disc off of the mandrel over the washer as the discs are bent backward while passing through the pipeline.

The plastic discs will of course be molded in a variety of diameters so as to cover a large range of pipeline sizes. Typical diameters range from a few inches to several feet. The depth of the notched-out segments, and therefore, the radial extent of the outer portion of each disc is preferably somewhere in the range from 40 to 80 percent of the total diameter of the disc in order to provide relatively long and flexible scraper segments.

Other objects and advantages of the invention will become apparent during the following discussion of the drawing, wherein:

FIG. 1 is a prospective view of a scraper assembly according to the present invention shown adjacent to a pipeline of somewhat smaller inside diameter into which the scraper is about to be introduced;

FIG. 2 is a plan view of a typical molded plastic scraper disc according to this invention;

FIG. 3 is a cross sectional view taken on line 3—3 of FIG. 2; and

FIG. 4 is a partial sectional view showing a portion of the assembly inside of the pipeline.

Referring now to the drawing, the illustrative embodiment of the present invention includes a mandrel M having shoulder means S mounted near each end, adjacent to a threaded portion (not shown) adapted to receive a nut N having a washer-like shoulder W facing inwardly and contacting the central portion 12 of the scraper disc 10 against which it presses to hold the disc securely on the mandrel end. The whole assembly is located adjacent to the open end of a pipeline P whose diameter is smaller than the relaxed outside diameter D of each disc 10. When introduced into the pipeline in the manner well known per se, the scraper discs bend to the contour as shown in FIG. 4 and provide scraping action against the inner peripheral surfaces of the pipeline P.

Each disc has a central portion 12 which extends from the center of the disc to the vicinity of the inner ends of the notched-out segments 22 of the disc and includes a central hole 14 in which the disc receives the mandrel M. Further out on the central portion 12 is the aforementioned interlocking pattern comprising an annular series of projections 16 and sockets 18 which are located on at least one face of each disc such that when the discs are stacked, one mated against another with the projections and sockets interlocking, the discs will be mutually oriented with their scraper and notched-out segments disposed in the relative positions shown by either pair of discs in FIG. 1.

The outer portion of each disc 10 is labelled 20 in FIG. 2, and extends from approximately the innermost point of each notched-out segment 22 to the outer periphery 26 of the disc. Between the notched-out segments 22 are scraper segments 24 which are at least as wide as the notched-out portions 22 measured in the peripheral direction, and preferably somewhat wider so that a certain amount of overlap occurs between the scraper segments of the discs in each pair. As can be seen in FIG. 1, the scraper segment 24' overlaps the scraper segments labelled 24" such that each segment of the trailing disc in each pair seals the notched-out segment space between two scraper segments of each leading disc in a pair. In this way, each pair of discs scrapes the entire inner periphery of the pipeline as it passes therethrough without leaving any unscraped longitudinal streaks inside thereof. Moreover, the fact that the notched-out segments 22 have some substantial width permits the scraping segments of the same disc to approach each other as they are bent into the position shown in FIG. 4 so that the effective outside diameter of the discs can be reduced without experiencing puckering or breakage, as would be the case if the scraper segments 24 were separated from each other merely by slits, rather than by voids of substantial width.

Thus, the relative proportioning of the disc features is of importance, namely, that the notched-out segments 22 should extend deeply into the disc from its outer periphery 26 so as to make the scraper segments relatively long as measured in the radial direction, whereas the notched-out segments should be wide enough to permit the scraper segments to approach each other when they are bent into the position as shown in FIG. 4, while not being so wide as to prevent the scraper segment of a trailing disc from closing the void between scraper segments of a leading disc against which it is mounted. The thickness of the disc will of course depend upon the characteristics of the material from which it is made, the thickness being sufficient to provide a strong spring action holding the scraper segments tightly against the inner surface of the pipeline being scraped. On the other hand, the thickness of a molded plastic disc should not be so great as to cause the scraper segments to break off by snapping of the plastic material when bent by introduction into a pipeline or passage therethrough.

The diameter of each shoulder S, or washer W, should be sufficient to prevent stripping of the disc from the mandrel when the latter is being pulled through a pipeline, the maximum diameter being approximately equal to the diameter of said inner portion 12 of the disc, and preferably being of somewhat lesser diameter, to facilitate bending of the scraper segments. It is the flexibility of the segments 24 and the fact that they overlap and tend to seal each other that makes the present structure suitable for use in widely graduated pipeline diameters.

The present invention is not to be limited to the illustrative embodiment shown in the drawing, for obviously changes may be made therein within the scope of the following claims.

We claim:

1. A multiple disc pipeline scraper and batch separator structure, comprising:
    (a) disc supporting mandrel means having paired shoulder means spaced apart to receive and clamp at least one group of stacked discs; and
    (b) plural discs in the group made of flexible material and having central portions with holes therethrough to receive said mandrel means and having outer portions comprising scraper segments separated by notched-out segments, and the discs having on the faces of their central portions matching patterns of projections and sockets which are oriented and disposed with respect to said segments such that when two discs are mated face to face with the projections of one disc interlocked in the sockets of a mating disc, the scraper segments of one disc will be positioned to cover the notched-out segments of the other.

2. In a structure as set forth in claim 1, said patterns of projections and sockets being the same on the plural discs, and comprising on each disc an annular series of alternate projections and sockets whose angular positions are aligned with the angular positions of the scraper and notched-out segments.

3. In a structure as set forth in claim 1, each scraper segment subtending a greater angle measured from the center of the disc than the angle subtended by a notched-out segment, and said patterns when interlocked by mating of adjacent discs being operative to locate each scraper segment symmetrically to cover a notched-out segment of an adjacent disc.

4. In a structure as set forth in claim 1, the radial extent of each scraper segment of a disc as measured from the innermost surfaces of contiguous notched-out segments to the periphery of the disc being in the range of about 40 to 80 percent of the total radius of the disc.

5. In a structure as set forth in claim 1, said discs being made of moldable polyurethene.

References Cited

UNITED STATES PATENTS

| 2,972,156 | 2/1961 | Ver Nooy | 15—104.06 R |
| 3,047,895 | 8/1962 | Ver Nooy | 15—104.06 R |

EDWARD L. ROBERTS, Primary Examiner